Nov. 30, 1943. D. H. KINLOCH 2,335,766
PACKAGE FOR COILED PHOTOGRAPH FILM
Filed April 29, 1940
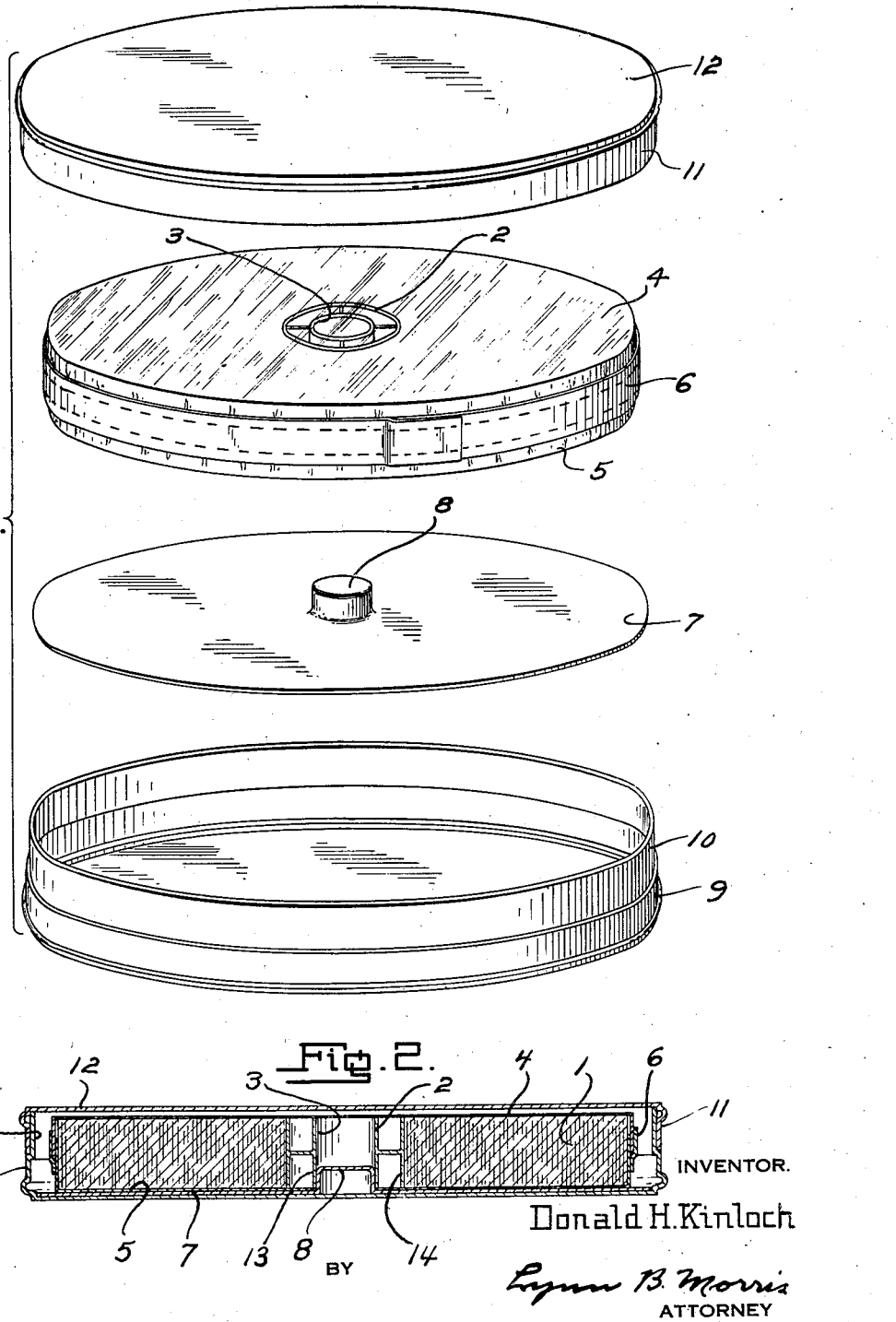
INVENTOR.
Donald H. Kinloch Patented Nov. 30, 1943

2,335,766

UNITED STATES PATENT OFFICE 2,335,766

PACKAGE FOR COILED PHOTOGRAPH FILM

Donald H. Kinloch, Parlin, N. J., assignor, by mesne assignments, to E. I. du Pont de Nemours & Company, Wilmington, Del., a corporation of Delaware Application April 29, 1940, Serial No. 332,361

11 Claims. (Cl. 206—52)

This invention relates to packages of coiled films. More particularly it relates to packages of coiled photographic films. Still more particularly it relates to packages of coiled light sensitive cinematographic film.

The invention has for an object to provide a package of film from which the coiled film may be easily removed. A further object is to provide a photographic film package which can be safely transported. A related object is to provide a photographic film package which will protect the coiled film against pressure, abrasion and/or friction markings during shipment and handling. A still further object is to provide a photographic film package wherein the coiled film is maintained out of pressure contact with the peripheral walls of the package. Another object is to provide an economical and efficient package for a coiled roll of light sensitive film which requires a minimum of packing or wrapping material.

The packaging of film in the coiled form, particularly photographic film, presents a number of difficulties. The coiled film must be maintained in that state to prevent injury, waste and to enable efficient use. In the case of photographic film especially light sensitive photographic film, this is especially true. Such film, particularly motion picture film, is often transported considerable distances and subjected to much handling. If one convolution moves relative to another, it is liable to damage the light sensitive emulsion in that "cinch" markings show up on development of the film. If the film coil moves radially in the container it is liable to show pressure mark images upon development. Also, such dished rolls are liable not to fit in camera and sound recorder magazines where side clearances are small.

To overcome this it has been the practice to place wads of packing paper around the periphery of the coil so as to position the film coil away from the sides of the container. Another method has been to place the film in a polygonal envelope and fold the corners to form buffers between the film coil and container, usually a metal can.

The prior art packages just described have some merit but do not fully prevent pressure markings due to mechanical shock, e. g. by dropping a package, or markings caused by bulging of the film coil or "dishing" in transportation.

It has now been found that the objects hereof can be accomplished and the above-mentioned disadvantages overcome by packaging coiled film elements in a container in a manner which involves centrally positioning the coiled film element by a hub member co-acting with the core of the film coil in the hereinafter described manner. A coil of film is loosely mounted on a floating sheet of rigid or substantially rigid material which has a hub portion which extends into the aperture at the center of the coil. The sheet has a greater diameter than that of the film coil and fits snugly into the outer container or film can, but can be removed therefrom. The film coil may be further protected or wrapped in various ways, for example, with a covering of paper or transparent wrapping material, e. g. cellulosic wrapping material before being mounted on the floating sheet with the hub member. Suitable methods of wrapping and wrappers are described in U. S. Patents 1,898,857 and 1,898,858.

The invention will be more fully understood by referring to the accompanying drawing wherein similar reference numerals refer to similar parts throughout the several views.

Fig. 1 shows in perspective the parts of package as they are about to be assembled.

Fig. 2 is a section taken through the diameter of the assembled film package.

As indicated in the drawing a photographic film element 1 is coiled about a core or spool 2 having an aperture 3. It is wrapped with sheets of transparent regenerated cellulose wrapping material 4 and 5 which extend down the periphery of the film coil and overlap to a substantial extent. The overlapping edge is fixed or sealed by means of a narrow strip 6 preferably a tape coated with an adhesive. The sealing strip or tape may be made of various materials such as paper, cloth, cellulosic or resinous materials, etc., which do not have a deleterious or harmful effect on sensitized film. The wrapped film coil is then mounted on the floating disk member 7 by placing the aperture of the film core 3 about the hub 8 of the floating disk. The floating disk has a diameter which is greater than that of the wrapped film coil. The floating disk and wrapped film coil are then placed in a film container 9 having a flange 10 which engages a cooperating flange 11 on the interfitting cover 12. The disk is slightly smaller in diameter than that of the can body and cover and fits snugly therein. The dimensions of the floating disk and wrapped film are such that a substantial amount of clearance is maintained at all times between the wrapped film coils' exterior and the inner surface of the film can or container. The containers are usually made of sheet metal, e. g. tin plate, but may be made of plastic materials. They are generally round, but may be polygonal in shape. The invention is not limited to the specific type of container shown. On the contrary various types of containers having body and closure members may be used. The closure member or lid may contain a flange or depressed lip which fits into the opening or side walls of the container body. It may contain an over-fitting flange portion which co-acts with the walls of the container as shown or both an inner and outer flange which co-act with the side walls or flange of the container body to form a seal.

While the drawing and above description relate to the preferred form of the invention, it is not limited to that specific embodiment. Thus, the floating disk need not be circular in form, but may be polygonal if desired. For example, a triangular, square, hexagonal, octagonal or other polygonal, elliptical or truncated circular form which fits snugly in the container may be used. It is preferably composed of metal such as tin plate, medium gauge, but may be made of various plastic materials, such as synthetic resins, cellulose derivatives, super polymers, cardboard, pressed board, etc. The circular or polygonal floating disk need not be smoothly continuous; on the contrary, it may be ribbed, button-pressed or have portions punched out if desired to save metal and weight in shipment. Hence, by the word "floating" disk is meant not only a circular member with a continuous surface, but the above described modifications. It is preferably made of relatively thin material which is sufficiently stiff or rigid as to be capable of sustaining more than the weight of the film coil, without buckling in the container. It may, of course, have some resiliency so long as it keeps the coil from contacting the cam during transportation and handling.

The hub portion 8 need not be integral with the floating disk but may be a separate member. In fact, it is preferably made of at least two parts including a body portion and hub portion. In a desirable construction a thimble-shaped hub is force-fitted into the floating disk. This type of structure is preferable with disk materials which are flow short. It likewise need not have a continuous surface, but may be reticulated, buttoned or have portions punched out. A separate hub which is connected to the disk by prongs bent over such as that of the film spool shown in U. S. Patent 1,565,655, for instance, may be resorted to. Welded, screwed or bolted wooden, plastic or metallic hubs may be used. The hub member need not be a unitary element but may be formed of short prongs, studs, ribs, etc. projecting up from the disk face and arranged at points on a circle whose diameter is substantially the same as that of the core diameter of the film coil. Thus, three or four prongs can be pressed out from the disk. The prongs are arranged along the film core circle. If the film is wound on a core having recessed portions as shown in the drawing, the disk prongs or studs can be arranged to interfit with either aperture 3, along the core wall 13 or wall 14 as shown in Fig. 2, or along combinations of such coactive points.

The invention furthermore is not limited to the use of a single floating disk or of a single hub or a single film coil in a package although the form shown in the drawing constitutes the preferred embodiment of the invention. Two of the floating disks may be used, one on each side of the film coil. This makes a package which is even more shockproof but less economical. Similarly, a hub can be placed on each side of the floating disk and a wrapped film spool placed on each side thereof, and both placed in a single can or container. The hub in general is slightly less in diameter than the inner aperture of the film coil or core so that a snug fit may be had.

The coiled film has been shown as being mounted on a spool or core. This is the conventional practice at the present time, metallic or plastic materials such as resins and cellulose derivatives being used. However, the film core is not an essential feature of the invention but is illustrative of its preferred aspects. Film rolls or coils having no core but an aperture formed by an inner convolution of the film may be similarly packaged. Likewise, it may be wrapped on a paper core.

Film coils which do not contain a protective wrapper but merely means to keep the coils from unwinding, such as a sealing strip, may be mounted on the novel floating disk hereof and placed in a light-proof can or container. A plurality of transparent or opaque wrapping sheets or wrappers may be used. Thus, a film coil wrapped with a transparent wrapping material as shown in the drawing may be placed in a square, circular or polygonal lightproof envelope after the manner shown in U. S. Patent 1,925,565, which may then be mounted on one or more floating disks in the can or container. The film coils are preferably wrapped in waterproofed cellulosic material such as regenerated cellulose as shown. However, other moisture-proof wrapping foils, for example, thin cellulose acetate, ethyl cellulose, polyvinyl alcohol and acetal, and similar synthetic plastic sheetings may also be used for wrapping the film rolls.

This mode of covering effectively protects against any accumulation of lint or foreign particles and preserves the flexibility and toughness of the film by retention of solvents and moisture.

It is obvious that the parts can be assembled in various manners. The wrapped film coil can be first mounted on the floating disk and the assembled two parts placed in the can and the lid placed thereon, or the disk can first be placed in the can body 9, next the wrapped film coil and then the cover 12 placed thereon. The cover may be sealed to body 9 in various ways such as by the use of an adhesive tape similar to that in which the wrapping sheets 4 and 5 are sealed about the coil of film.

The invention is not limited to light sensitive film coil packages, although that constitutes its preferred form and it solves problems which are peculiar to that art. Developed, processed and finished films can also be transported in such hub-provided containers without being first wound on reels, thus reducing the shipping weight.

This invention has a number of advantages, among which are:

(1) It eliminates the bulk of paper stuffing which has been used in prior art packages. Paper often deleterious to sensitive film because of fillers and chemicals, etc. which form gases and vapors.

(2) The form of package eliminates pressure markings or latent images formed by contact of the periphery of the coiled film with the container wall which may, of course, be through a compact wadding of paper.

(3) The rolls are kept in alignment which means that no bulging with its attendant disadvantages, e. g. friction marking occurs. The properly aligned films readily fit into film magazines of small clearances.

(4) The wrapped film may be quickly and easily removed from the can or container without injury thereto. There is no need to first remove paper stuffing. The lid is first removed and the wrapped film, and also the floating hub if held properly fall out of the can body.

(5) It provides a safe package which may be quickly and economically prepared and involves only a few parts.

(6) The package is quite simple to make and can be readily assembled by a relatively unskilled operator.

Still other advantages will be readily apparent to those skilled in the art.

As many apparently widely different embodiments of this invention may be made without departing from the spirit and scope thereof, it is to be understood that I do not limit myself to the specific embodiments hereof except as defined in the appended claims.

I claim:

1. A package comprising a coil of film, a removable floating disk member having a hub portion which co-acts with the core of said coil, and having a greater outside diameter than that of the coil of film, said disk member and coil being in a container, the floating disk member fitting snugly within the container and being capable of rotary movement therein.

2. A package of coiled film material comprising a coil of film having a central aperture mounted on the hub of a rigid removable floating disk member of narrow cross-section having an outside diameter greater than the outer diameter of said coiled film, said disk member and coil being in a container, the floating disk member fitting snugly within the container and being capable of rotary movement therein.

3. In a package for light sensitive photographic film comprising a container, the combination of a removable floating disk member for retaining a coiled film in a fixed position in said container having a hub portion which co-acts with the core of a coil of film, said floating disk member snugly fitting in the container and being capable of rotary movement therein and having a diameter greater than the diameter of the coil of film.

4. In a package for light sensitive photographic film comprising a container, the combination of a rigid removable floating disk member of narrow cross section for retaining a coiled film in a fixed position in said container having a short hub portion which extends a short distance into and co-acts with the aperture of a coil of film, said disk member snugly fitting in the container and being capable of rotary movement therein and having a diameter greater than the diameter of the coil of film.

5. In a package for cinematographic film comprising an interfitting circular container and cover, the combination of a coil of film wrapped in a protective covering material with a removable floating disk member, said member snugly fitting in said container and being capable of rotary movement therein having a hub portion which interfits with the central aperture of the coil of film and an exterior diameter substantially greater than the outside diameter of said wrapped coil of film.

6. A package for motion picture film comprising a circular container body, a removable floating disk member having a projecting hub snugly fitted to said body which is capable of rotary movement therein, a wrapped coil of film having a central apertured film core mounted on said hub, said member being of greater diameter than the exterior diameter of the wrapped coil of film and a circular container cover interfitting with said container body.

7. A package for motion picture film comprising a circular metallic container body, a rigid, removable floating disk member of narrow cross-section having a projecting hub snugly fitted to said body which is capable of rotary movement therein, a wrapped coil of film having a central apertured film core mounted on said hub, said member being of greater diameter than the exterior diameter of the wrapped coil of film and a circular metal container cover interfitting with said metal container body.

8. A package for motion picture film comprising a circular container body, a floating circular disk member having a projecting central hub fitted to said body which is capable of rotary movement therein, a wrapped coil of film having a central apertured film core mounted on said hub and snugly fitting therewith, said member being of greater diameter than the exterior diameter of the wrapped coil of film and a circular container lid interfitting with said container body.

9. A package for motion picture film comprising a circular container body having a recessed flange portion, a removable floating circular disk member having a projecting central hub fitted to said body which is capable of rotary movement therein, a wrapped coil of film having a central apertured film core mounted on said hub and snugly fitting therewith, said member being of greater diameter than the exterior diameter of the wrapped coil of film and a circular lid having a flange portion interfitting with the flange portion on said container body.

10. A package for motion picture film comprising a circular container body, a removable floating circular disk member having an upstanding central hub snugly fitting in said body which is capable of rotary movement therein, a coil of film having a central apertured film core mounted on said hub and snugly fitting therewith, said coil being wrapped and sealed in an air-tight overlapping wrapper of moisture-proof wrapping material, said member being of greater diameter than the exterior diameter of the wrapped coil of film and a circular container lid interfitting with said container body.

11. A package for motion picture film comprising a light-proof circular container body, a rigid removable floating disk member of narrow cross-section having at least one projecting hub snugly fitted to said body which is capable of rotary movement therein, at least one coil of film having an apertured film core mounted on said member, said hub projecting less than half way through said core, said floating disk member being of greater diameter than the exterior diameter of the wrapped coil of film and a light-proof circular container cover interfitting with said container body.

DONALD H. KINLOCH.

CERTIFICATE OF CORRECTION.

Patent No. 2,335,766. November 30, 1943.

DONALD H. KINLOCH.

It is hereby certified that error appears in the printed specification of the above numbered patent requiring correction as follows: Page 1, first column, line 10, for "safetly" read --safely--; page 2, first column, line 39, for "cam" read --can--; and second column, line 67, after "often" insert --is--; and that the said Letters Patent should be read with this correction therein that the same may conform to the record of the case in the Patent Office.

Signed and sealed this 8th day of February, A. D. 1944.

(Seal)

Henry Van Arsdale,
Acting Commissioner of Patents.